(12) United States Patent
Sakai

(10) Patent No.: US 6,322,862 B1
(45) Date of Patent: Nov. 27, 2001

(54) PRESSED FLOWERS ENCLOSED ARTICLE

(75) Inventor: Tsuyoshi Sakai, Tokyo (JP)

(73) Assignee: Doppel Co., Ltd. (JP)

( * ) Notice: Subject to any disclaimer, the term of this patent is extended or adjusted under 35 U.S.C. 154(b) by 0 days.

(21) Appl. No.: 09/508,802

(22) PCT Filed: Sep. 17, 1998

(86) PCT No.: PCT/JP98/04189

§ 371 Date: Apr. 17, 2000

§ 102(e) Date: Apr. 17, 2000

(87) PCT Pub. No.: WO99/14062

PCT Pub. Date: Mar. 25, 1999

(30) Foreign Application Priority Data

Sep. 17, 1997 (JP) .................................... 9-252549

(51) Int. Cl.⁷ ................................................ A47G 1/12
(52) U.S. Cl. ........................... 428/13; 428/14; 428/66.4; 428/66.5; 428/68; 428/76; 428/192; 428/332; 428/337; 428/339; 428/346; 428/354; 428/415; 428/542.2
(58) Field of Search .................... 428/13, 182, 28, 428/14, 76, 68, 192, 66.4, 66.5, 332, 337, 339, 346, 354, 424.4, 415, 542.2; 47/41.01, DIG. 11; 40/737, 124.06; 206/484.1, 484.2, 423

(56) References Cited

FOREIGN PATENT DOCUMENTS

| 4-41401 A | * | 3/1995 | (JP) . |
| 487736 B1 | * | 3/1995 | (EP) . |
| 408309914 A | * | 11/1996 | (JP) . |
| 411078398 A | * | 3/1999 | (JP) . |

* cited by examiner

*Primary Examiner*—Deborah Jones
*Assistant Examiner*—Abraham Bahta
(74) *Attorney, Agent, or Firm*—Schnader Harrison; Segal & Lewis LLP

(57) ABSTRACT

An object containing pressed flowers sealed therein which is composed of a base layer, an intermediate layer of molten resin in which is sealed a pressed flower, and a surface layer of transparent film, with these three layers integrally laminated on top of the other, characterized in that the intermediate layer is formed by pressing with heating under reduced pressure from a meltable porous plastic film such that the molten plastic adheres closely to the pressed flower to seal it and also fixes the pressed flower to both the base layer and the surface layer of transparent film. It retains the natural color of the pressed flower for a long period of time without deterioration by air and moisture.

15 Claims, 4 Drawing Sheets

PRESSED FLOWERS ENCLOSED ARTICLE

BACKGROUND OF THE INVENTION

1. Field of the Invention

The present invention relates to an object containing pressed flowers sealed therein. More particularly, the present invention relates to an object containing pressed flowers (or dried flowers) sealed therein which retains the natural beauty of flowers for a long period of time when used as decoration for glasses, tableware, furniture, mirrors, clocks, electric appliances, message boards and sheets, name plates, memorial cards, stationery, post cards, telegrams, photographs, etc.

2. Description of the Related Art

There have been known ornaments of pressed flowers or dried leaves stuck on cardboard or plastic sheet. They are used to decorate memorial cards and telegrams.

These conventional ornaments of pressed flowers in sheet form are typically constructed as shown in FIG. 1. A pressed flower (2) is placed on cardboard or plastic sheet (1) and covered with Japanese paper or transparent plastic film (3). FIG. 2 is a sectional view taken along the line A—A in FIG. 1. It is to be noted that the Japanese paper or plastic film (3) covers the pressed flower (2) in the bag-like structure and only its peripheral part is stuck to the cardboard or plastic sheet (1) by an adhesive layer (4). FIG. 3 is a sectional view taken along the line A—A in FIG. 1. It is to be noted that the pressed flower (2) is embedded in the adhesive layer (4) and is laminated with the transparent plastic film (3).

These ornaments of pressed flowers should be produced in such a way that as little air and moisture as possible remains in the periphery of the pressed flower (2). To this end, contrivances have been made to carry out sticking or lamination in a reduced pressure atmosphere and improvements have been made in the method of contact bonding.

The disadvantage of the ornament of bag-like structure as shown in FIG. 2 is that air and moisture remain around the pressed flower (2) in the bag-like closed space and they rapidly deteriorate the pressed flower (2), destroying the natural color and shape of the flower. Moreover, the bag-like structure is vulnerable to damage. Once the surface film (3) is broken at the part (B) close to the pressed flower (2), the pressed flower (2) is exposed to the air immediately and becomes deteriorated.

If Japanese paper is used in place of transparent plastic film (3), deterioration proceeds more rapidly because it does not isolate the pressed flower from the air.

These disadvantages are somewhat eliminated if the pressed flower (2) is embedded in the adhesive layer (4) as shown in FIG. 3. However, air bubbles remain in the space between the pressed flower (2) and the base (1), and it is difficult to remove them completely from the adhesive layer (4) even in the case of lamination under in a reduced pressure atmosphere. Moreover, it is difficult to establish adequate conditions for evacuation and temperature in the manufacturing process. This has led to difficulties in efficient production of high-quality pressed flower ornaments which retain the natural color for a long period of time without discoloration and deterioration.

The conventional product as shown in FIG. 3 contains air bubbles which make the transparent plastic film (3) liable to damage and the pressed flower (2) becomes easily deteriorated as it is exposed to the air directly.

Also in the adhesive layer (4), irregularity on the base (1) surface greatly affects the spreading of the adhesive and leaves air bubbles at a higher probability. Therefore, the base layer is required to be as flat as possible. These disadvantages involved in the conventional ornaments with pressed flowers make it difficult to reuse the pressed flower by cutting it out of the memorial card or telegram. When the periphery of the pressed flower is cut by scissors, the air layer or air bubbles are broken and the pressed flower (2) is exposed to the air, which causes deterioration. In addition, the amount of residual air or the number of residual air bubbles increases as the pressed flower ornament becomes larger. Consequently, the conventional product cannot be large enough to decorate the wall.

Another disadvantage of the conventional pressed flower ornament which employs cardboard or plastic sheet as the base layer (1) as shown in FIGS. 2 and 3, is that the base layer (1) tends to locally warp as the adhesive layer (4) hardens and shrinks and flatness of the base layer (1) itself cannot be maintained. And the air tends to remain due to this warpage.

In the case where the base layer (1) is glass or wood, the pressed flower does not closely stick to the base layer as long as the conventional method is employed.

With the foregoing in mind, the present inventors have carried out extensive studies to produce an ornament of pressed flowers by using a hot-melt adhesive for the adhesive layer (4). This hot-melt adhesive permits bonding in an atmosphere at a very low pressure. Bonding in this way minimizes the amount of residual air or the number of air bubbles. Hence, the pressed flower remains less deteriorated over a long period of time. In addition, the hot-melt adhesive prevents the base layer (1) from warping and can be applied to the base layer (1) of glass or wood or the base layer (1) with a large area. Thus, the resulting ornament retains the beauty of natural color for a long period of time.

The present invention has been completed to address the problems involved in the prior art as mentioned above. It is an object of the present invention to provide a new, high-quality, artistic ornament of pressed flower which can be produced efficiently.

OBJECT AND SUMMARY OF THE INVENTION

The gist of the present invention resides in an object containing pressed flowers sealed therein which is composed of a base layer, an intermediate layer of molten resin in which is sealed a pressed flower, and a surface layer of transparent plastic film, with these three layers integrally laminated on top of the other, characterized in that the intermediate layer is formed by pressing with heating under reduced pressure from a meltable porous plastic film such that the molten plastic adheres closely to the pressed flower to seal it and also fixes the pressed flower to both the base layer and the surface layer of transparent plastic film.

The present invention includes the following embodiments in which the meltable porous plastic film is one which has the three-dimensional open-cell structure; in which the meltable porous plastic film is one which has an average pore diameter of 1.0 mm or less; in which the meltable porous plastic film is one which melts at 110° C. or lower; in which the intermediate layer has a thickness of 4000 $\mu$m or less; and in which the intermediate layer seals the vacuum-dried pressed flower such that substantially no air bubbles remain in the periphery of the pressed flower.

The present invention also includes the following embodiments in which the transparent surface layer has a thickness of 300 $\mu$m or less; in which the transparent surface layer is a multi-layered laminate film; and in which the transparent surface layer has a hard coat layer as the outermost surface layer.

The present invention also includes the following embodiments in which the base layer is glass, ceramic, plastic, paper, woody material, or metal, or a composite or laminate thereof; and in which the base layer is a plastic laminate sheet having a color printed layer or an integrally colored layer.

The present invention also includes the following embodiments in which the color printed layer or integrally colored layer functions as an outermost layer, an intermediate layer or as both of them; in which the color printed layer is formed together with a white film layer; in which the laminate plastic sheet is one which warp less; and in which the laminate plastic sheet has a thickness of 3000 $\mu$m or less.

DESCRIPTION OF THE PREFERRED EMBODIMENTS

Figure 1:
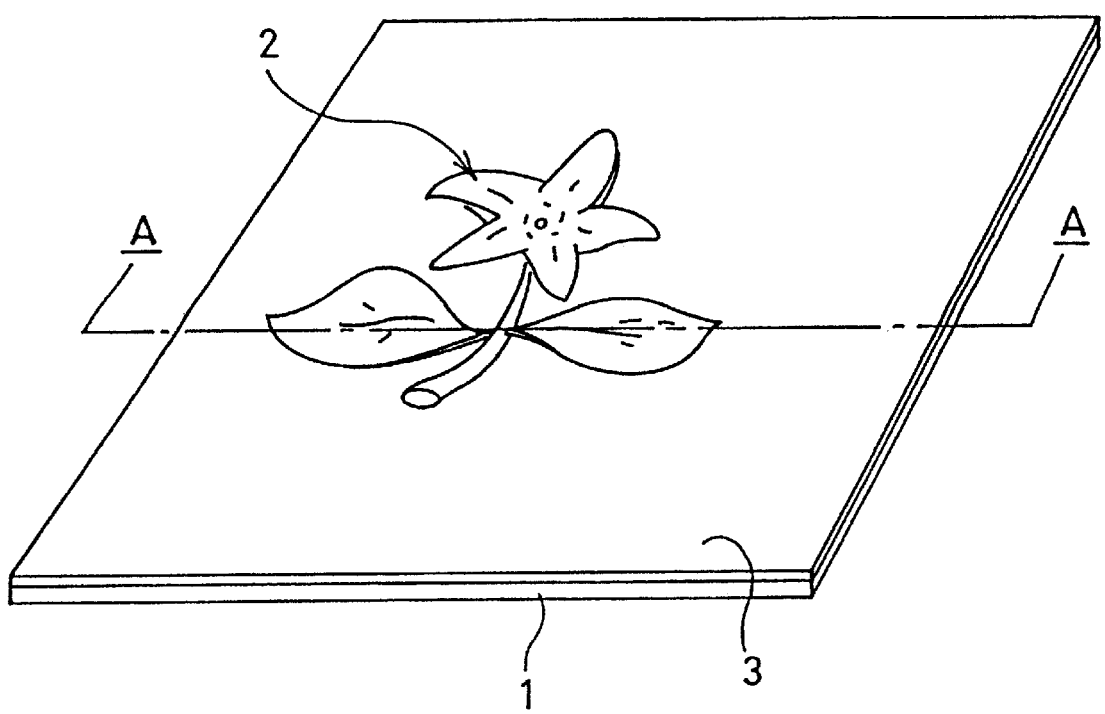
FIG. 1 is a perspective view showing the external appearance of an ornament of pressed flower.
Figure 2:
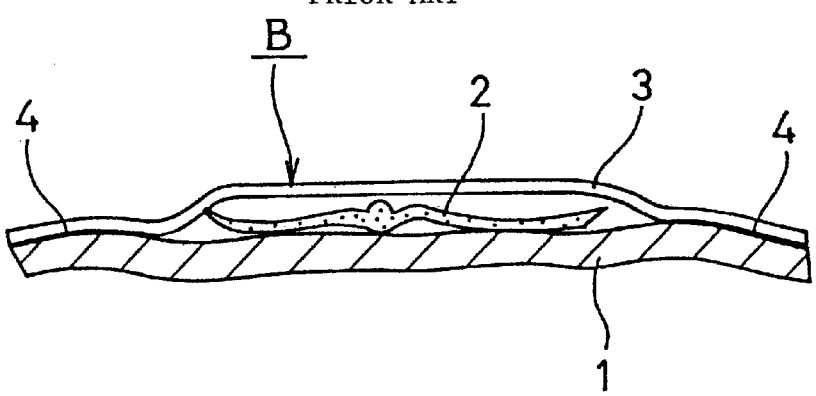
FIG. 2 is a sectional view of a conventional ornament of pressed flower in bag-like structure.
Figure 3:
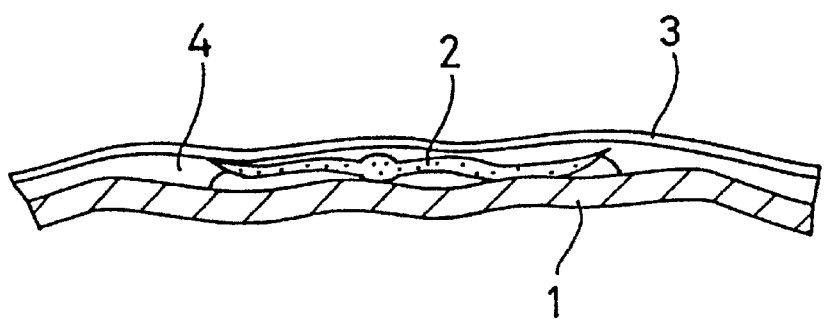
FIG. 3 is a sectional view of a conventional ornament of pressed flower in laminate structure.

The present invention has the features mentioned above. It will be explained below in more detail with reference to the drawings. The present invention is directed to an object containing pressed flowers sealed therein, which is shown in FIG. 1 (perspective view) and in FIG. 4 (sectional view). It is composed of a base layer (1), an intermediate layer (5) of molten resin (50) in which is sealed a pressed flower (2), and a transparent surface layer (6), with these three layers integrally laminated on top of the other, characterized in that the intermediate layer (5) is formed by pressing with heating under reduced pressure from a meltable porous plastic film such that the molten plastic (50) adheres closely to the pressed flower to seal it and also fixes the pressed flower to both the base layer (1) and the surface layer (6) of transparent film. What is important in the aforesaid structure is that the molten resin (50) adheres closely to the surfaces of petals, leaves, stems, and seeds having minute surface irregularities, without leaving air bubbles thereon, so that the pressed flower (2) is embedded in the intermediate layer (5). In addition, upon curing, the molten resin (50) firmly adheres to the base layer (1) and the transparent surface layer (6).

The aforesaid construction of the intermediate layer is realized by pressing with heating under reduced pressure a meltable porous plastic film and then curing the molten resin (50).

The meltable porous plastic film is composed of minute cells. When it is melted under reduced pressure, minute cells permit air and moisture to escape through them from the vicinity of the pressed flower (2) into the surrounding. As ae result, the meltable porous plastic film adheres closely to the pressed flower (2). This idea has never been involved in the conventional laminate structure. For the meltable porous plastic film to permit air and moisture to escape more effectively through the whole portion where the meltable porous plastic film is disposed, it should preferably have the three-dimensional open-cell structure. In addition, it should have an adequate degree of melting property so that it permits the pressed flower to be embedded therein without discoloration and damage to shape and tissue.

In this regard, the meltable porous plastic film should have the three-dimensional open-cell structure, with an average pore diameter 1.5 mm or less (e.g., 0.1 to 1.5 mm), preferably 1.0 mm or less (e.g., 0.1 to 1.0 mm). This size corresponds to 18–140 mesh (ASTM) or 16–150 mesh (Tyler). In addition, it should have a void ratio of 85% or less (e.g., 30–80%) and it should melt at 120° C. or lower, preferably 110° C. or lower, and more preferably from 60–85° C. Since the thickness of the intermediate layer (5) is 4000 $\mu$m or less, usually in the range of 100 to 1000 $\mu$m, the meltable porous plastic film should be 150–1500 $\mu$m thick. It may be used singly or plurally.

The average pore diameter depends on the film thickness. If the average pore diameter is less than 0.05 mm, the film is not readily available and the film does not permit air and moisture to escape efficiently under reduced pressure. If the average pore diameter is more than 1.5 mm, the film does not adhere closely to the pressed flower when it is melted, that is, the filling degree for embedding trends to be insufficient. If the thickness is from 150 to 1500 $\mu$m, the meltable porous plastic film should have a melting point of 110° C., preferably 60–85° C., and the average pore diameter of 0.05–1.5 mm, preferably 1.0 mm or less (e.g., 0.1–1.0 mm).

The meltable porous plastic film specified above may be formed from fine plastic powder by partial melting or compression, or it may be a foamed plastic, with its surface treated by plasma or irradiation. The raw material for the meltable porous plastic film may be selected from polyethylene, ethylene-ethyl acrylate copolymer, ethylene-vinyl acetate copolymer, ethylene-acrylic acid copolymer, and ethylene-methacrylic acid copolymer. These raw materials have good affinity for the pressed flower (2), adequate melting temperatures, and good flow properties, and they can be easily processed into the porous film.

Ethylene-vinyl acetate copolymer is one of the desirable raw materials, and it may also be used in the form of partially saponified product. A copolymer with saponified fraction about 10 eq % or less has good affinity with the pressed flower.

Figure 4:
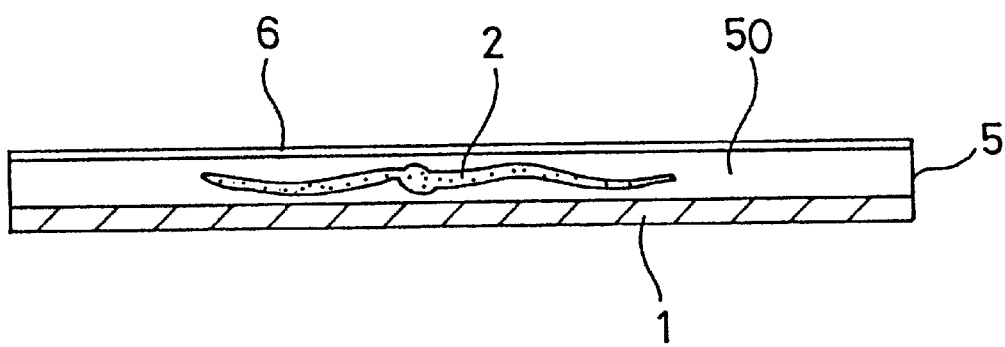
FIG. 4 is a sectional view of an object containing pressed flowers sealed therein as one embodiment of the present invention.

The above-mentioned meltable porous plastic film (or sheet) forms the intermediate layer (5) in which the pressed flower (2) is embedded as shown in FIG. 4. This step is carried out as follows. First, a pressed flower (2) is placed on the base layer (1). On the pressed flower (2) are placed sequentially a meltable porous plastic film and a non-meltable plastic film which forms the surface layer (6) of transparent film. Subsequently, the assembly is heated under reduced pressure at a high vacuum. Alternatively, on the base layer (1) are sequentially placed a first meltable porous plastic film, a pressed flower (2), a second meltable porous plastic film, and a non-meltable plastic film which forms the surface layer (6) of transparent film. Finally, the assembly is heated under reduced pressure at a high vacuum. The latter procedure is preferable.

When placed on the base layer, the pressed flower may be sprinkled with fine powder of the same kind as the meltable porous plastic film, and the fine powder is heated under pressure together with the meltable porous plastic film. This procedure is effective for thick pressed flowers (2). The fine powder should have a particle diameter of from 0.05 mm to 0.5 mm.

The above-mentioned meltable porous plastic film and fine powder for forming the intermediate layer (5) after melting and curing should be made of a highly transparent material, so that the natural color of the pressed flower (2) embedded therein is clearly visible. If necessary, they may be made of a colored material so that the intermediate layer (5) imparts a unique color to the pressed flower (2). In this case, too, a highly transparent material is desirable.

According to the present invention, the above-mentioned meltable porous plastic film effectively eliminates air from the vicinity of the pressed flower (2) during pressing under reduced pressure. In addition, the molten resin adheres closely to the surface of the pressed flower (2) being embedded. In this way the pressed flower (2) is protected from deterioration and discoloration by residual air and moisture in the intermediate layer. Thus the pressed flower (2) in the intermediate layer retains its natural bright color.

The embedding and sealing in this manner keeps airtightness, protecting the pressed flower (2) from deterioration, even if the surface layer (6) of transparent film is damaged unless the damage reaches the pressed flower (2). The above-mentioned meltable porous plastic film permits a large pressed flower to be sealed because the pressing under reduced pressure at a high vacuum permits air to escape efficiently over the entire plane surface. This holds true also in the case where a plurality of pressed flowers (2) (differing in kind and thickness) are arranged on the same base layer. Therefore, the present invention provides an object of large area containing pressed flowers sealed therein. Such an object can be used as a decorative wall board or a partition.

The decorative object according to the present invention permits the pressed flower (2) therein to be cut out for reuse. For example, a pressed flower sealed in a message card or telegram may be cut out for reuse. This is because the pressed flower (2) is entirely surrounded by a molten plastic which forms the cured intermediate layer (5).

The pressed flower (2) may be vacuum-dried flower of any kind, such as cosmos, pansy, baby's-breath, rose, and wheat, including their leaves, stems, and seeds.

The surface layer (6) of transparent film shown in FIG. 4 should preferably be made of a material which does not melt when the intermediate layer (5) is formed by pressing with heating. In addition, the material should have good transparence and good resistance to scratch and wear and to deterioration by light and heat.

The surface layer (6) of transparent film is not specifically restricted in thickness. An adequate thickness is 300 $\mu$m or less, or in the range of 40 to 300 $\mu$m, in consideration of production cost and transparency. The surface layer (6) may be of multi-layer structure. In this case, the inner layer in contact with the intermediate layer (5) should have good adhesion, and the outermost layer should be provided with a hard coating layer which is resistant to scratches and light and heat. For example, the surface layer (6) may be an adhesive layer (or a heat-seal layer) in contact with the intermediate layer (5) and an outermost layer (or a hard coating layer).

The transparent film may be polyester film (or PET film), polycarbonate film, polypropylene film, etc. which have good transparency and heat resistance. As the heat-seal layer, a film which exhibits adhesion during pressing with heating at about 60–100° C. may be used in general. Such a film is exemplified by polyethylene film, ethylene-ethyl acrylate copolymer film, and ethylene-vinyl acetate copolymer film.

The hard coating layer may be inorganic film (of silicon dioxide etc.) or organic film (of acrylic resin, silicon resin, hard urethane resin, etc.). It may be incorporated with fine powder of silica, $TiO_2$, $ZrO_2$, $SnO_2$, etc. so as to impart wear resistance and glare protection. It may also be incorporated with electrically conductive fine powder of ITO (indium tin oxide) or the like so as to prevent the surface from attracting dust electrostatically.

Glare protection and antistatic treatment mentioned above make the pressed flower (2) visible more vividly.

The adhesive film should have a thickness of about 10–200 $\mu$m and the hard coating layer should have a thickness of about 1–4 $\mu$m.

Needless to e.g., the adhesive film and hard coating layer are not always necessary. The surface layer (6) of transparent film should be constructed according to the use of the object containing the pressed flower sealed therein.

The base layer (1) shown in FIG. 4 may be any of glass, ceramics, plastics, paper, woody material, or metal, or a composite or laminate material thereof. The fact that the base layer can be formed from any of glass, ceramics, plastics, or woody material is one of the great advantages of the present invention.

The base layer (1) may be provided with an adhesive layer or may have its surface roughened (by plasma treatment or chemical etching for anchoring effect) so that it has good adhesion to the intermediate layer (5).

Even if the base layer (1) is a soft flexible sheet, there is no possibility that the pressed flower (2) peels off or exposes itself to the air. The base layer (1) of flat plastic sheet will not curl (or warp) so long as the aforesaid structure is employed. The base layer (1) may be colored as desired for the background which makes the color of the pressed flower more vivid.

In the present invention, the base layer (1) may be a laminate of polyester film, polycarbonate film, polysulfone film, polypropylene film, etc. This laminate structure effectively prevents curling or warping at the time of pressing with heating. In addition, the laminate may have an intermediate layer or an outermost layer or both of which are colored by printing or integral blending, so that the base layer (1) produces a better background effect.

For example, the base layer (1) may be composed of a white polyester film and a color-printed layer, with a heat-seal layer interposed between them.

The color printed layer is not always necessary if the pressed flower (2) is contrasted with the white background. However, it may be necessary if a colored or designed background is used.

If the intermediate layer (5) has a somewhat dull color, the pressed flower will be contrasted with the background if it is given a cream color by printing or integral blending.

The adhesive layer may be the same one as mentioned above. If the base layer (1) is composed of a plurality of film (or sheet) of polyester or the like, the individual film should have a thickness in the range of 20 to 200 $\mu$m and the adhesive layer should have a thickness in the range of 10 to 100 $\mu$m.

The base layer (1) in sheet form is not specifically restricted in thickness. However, it should preferably have a thickness in the range of 100 to 1000 $\mu$m so that it will not curl or warp when the above-mentioned structure is employed.

It is possible to use any adequate ink, pigment, or dye to prepare the layer colored by printing or integral blending. Metal powder blending or metallization is also acceptable.

If the base layer (1) is made of film or paper, it may be provided with an adhesive layer or double-face adhesive sheet on its back, so that it can be bonded to any object.

The invention will be described in more detail with reference to the following examples.

EXAMPLE 1

Figure 5:
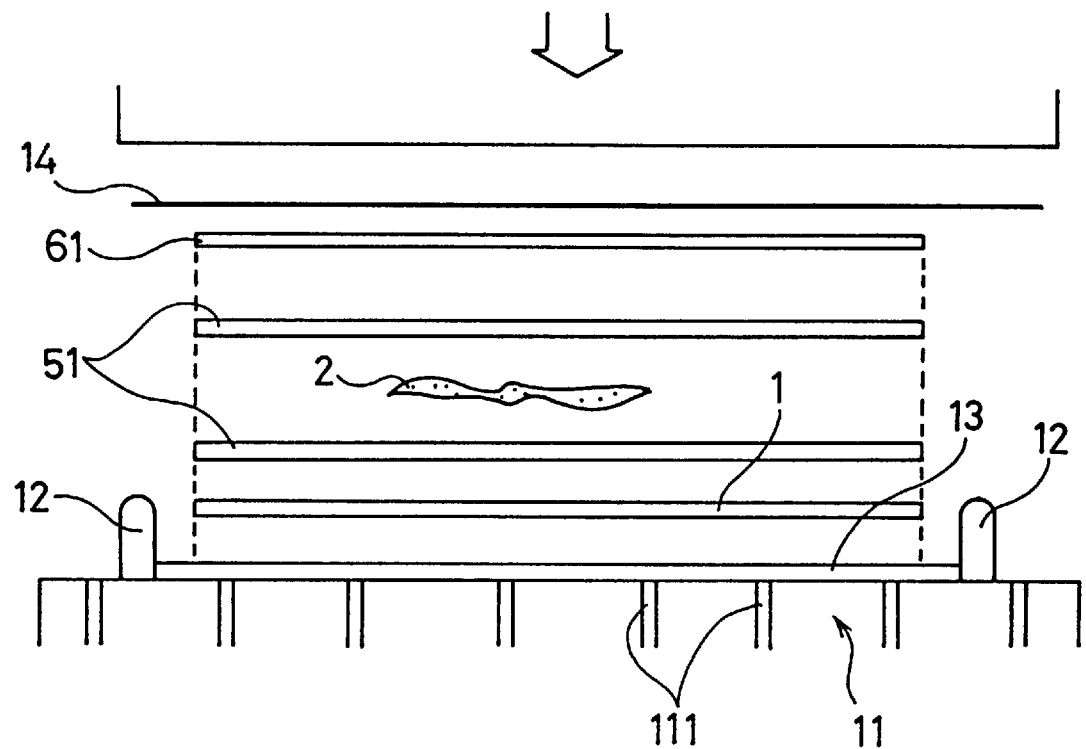
FIG. 5 is an exploded sectional view showing the laminate structure of an object containing pressed flowers sealed therein as one embodiment of the present invention.

The object of pressed flowers according to the present invention was produced by using a vacuum pressing apparatus as shown in FIG. 5. The apparatus has a support (11) in which are formed openings (111) for evacuation. The support has a flat area (300 by 300 mm) surrounded by a rubber rim (12). On this support were sequentially placed a cotton cloth (13) and a laminate PET (polyethylene terephthalate) film, 150 μm thick, as the base layer (1).

Figure 6:
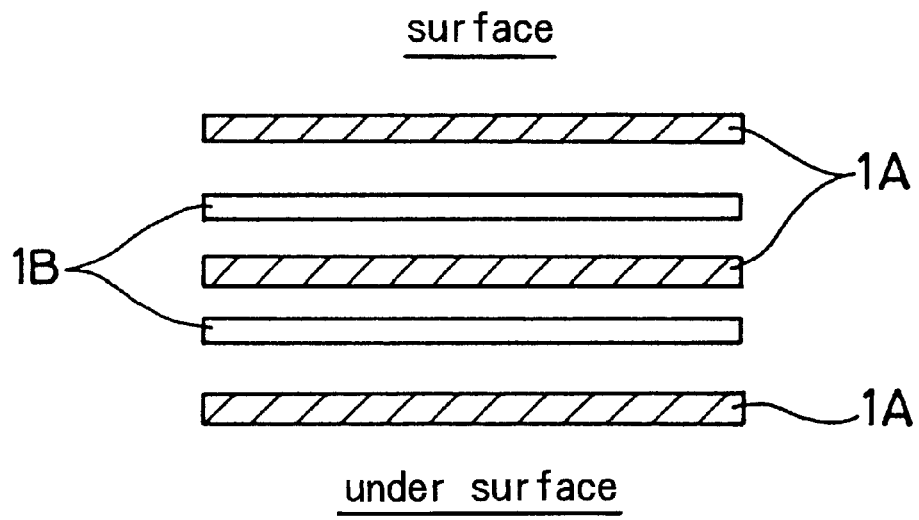
FIG. 6 is an exploded sectional view showing the laminate structure of the base layer.

The laminate PET film is composed of three layers of white PET film (1A) and two layers of heat-seal film (1B), which are placed alternately one over another and bonded together at 70–80° C., as shown in FIG. 6. The white PET film is 40 μm thick and contains titanium dioxide (as a white pigment). The heat seal film is 20 am thick and is made of ethylene-ethyl acrylate copolymer.

On the laminate PET film were sequentially placed the followings.

- a meltable porous plastic film (51) of ethylene-vinyl acetate copolymer which has a melting point of 75° C., a thickness of 0.6 mm, and an average pore diameter of about 0.2 mm (corresponding to ASTM 70 mesh).
- a vacuum-dried pressed flower (2) of pansy.
- a meltable porous plastic film (51), the same one as mentioned above.
- a transparent film (61), which is a 150 μm thick PET film.
- a cover sheet (14).

The resulting assembly was pressed (with about 1 atm) at about 80° C. under reduced pressure (close to the absolute vacuum of 760 mmHg).

The resulting laminate sheet is shown in FIG. 4. It is composed of the base layer (1), which is 150 μm thick, the intermediate layer (5), which is 800 μm thick, and the surface layer (6) of transparent film, which is 150 μm thick. In the intermediate layer (5) is embedded the pressed flower (2) which is sealed by the molten resin (50). It was found that the intermediate layer contains no air and air bubbles remaining therein.

The base layer (1) was completely flat without curling and warpage.

The pressed flower (2) retained its bright natural color for a long period exceeding six months.

EXAMPLE 2

The same procedure as in EXAMPLE 1 was repeated except that the intermediate layer (5), which is about 1000 μm thick, was formed from a meltable porous plastic sheet, with 5 eq % partially saponified. It has a thickness of 1.3 mm and an average pore diameter of 0.5 mm (corresponding to ASTM 35 mesh).

The product in this example was as good in quality as that in EXAMPLE 1.

EXAMPLE 3

The same procedure as in EXAMPLE 1 was repeated except that the base layer was replaced with a 2-mm thick transparent glass plate. Adhesion between the intermediate layer and the glass base layer was satisfactory. The product in this example was as good in quality as that in EXAMPLE 1.

EXAMPLE 4

Figure 7:
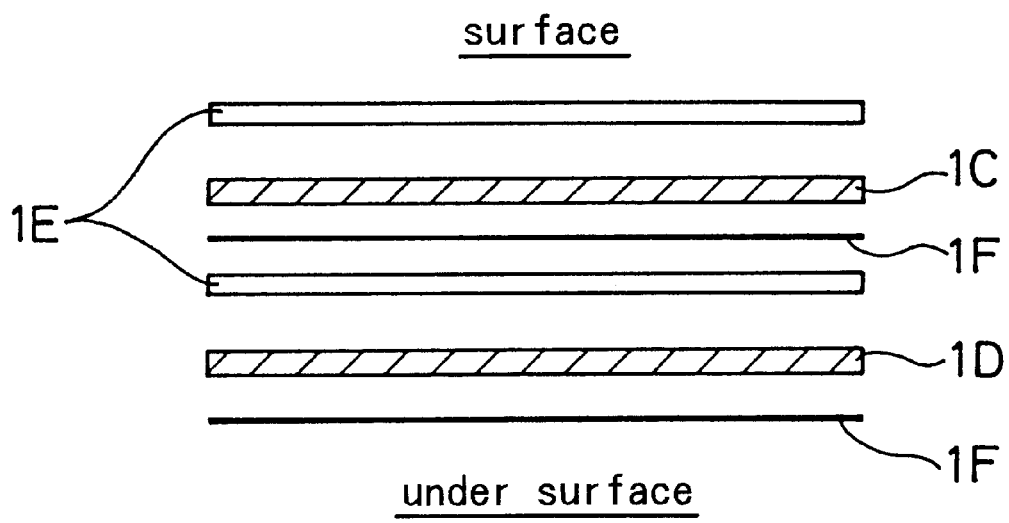
FIG. 7 is an exploded sectional view showing another laminate structure of the base layer.

The same procedure as in EXAMPLE 1 was repeated except that the base layer was replaced with a laminate composed of the following layers as shown in FIG. 7.

PET film (1C), 50 μm thick.

PET film (1D), 75 μm thick.

ethylene-ethyl acrylate copolymer film (1E), 50 μm thick.

print layer in cream color (1F).

The pressed flower (2) looked beautiful, and the resulting product was free of curling and warpage.

EXAMPLE 5

The same procedure as in EXAMPLE 1 was repeated except that the meltable porous plastic film was replaced with that of ethylene-ethyl acrylate copolymer having a melting point of 77° C. The duration of pressing with heating was extended about 1.5 times compared with that in EXAMPLE 1. The product in this example was as good in quality as that in EXAMPLE 1.

Effect of the invention: As explained above, the present invention employs a meltable porous plastic film (or sheet), so that the pressed flower (2) can be sealed under reduced pressure without air or air bubbles being entrapped in the space surrounding it. Therefore, the molten resin adheres closely to the surface of the pressed flower (2), and the pressed flower can be embedded and sealed completely. Thus the pressed flower (2) which has been embedded and sealed in this manner retains its bright natural color for a long period of time without discoloration and deterioration by residual air and moisture.

The embedding and sealing in this manner keeps airtightness, protecting the pressed flower (2) from deterioration, even if the surface layer (6) of transparent film is damaged unless the damage reaches the pressed flower (2). The meltable porous plastic film makes it possible to make an object containing pressed flowers sealed therein which has as large an area as desired, because it permits rapid evacuation over the entire surface. In other words, the present invention provides an object of large area containing pressed flowers differing in kind and thickness which are arranged on the same surface. Such an object can be used as a decorative wall board or a partition.

The pressed flower embedded in a plastic layer according to the present invention can be cut out of the plastic layer for another use. For example, the pressed flower sealed in a message card or telegram paper may be cut out for reuse. This is attributable to the cured intermediate layer (5) in which the molten resin adheres closely to the pressed flower (2).

Even if the base layer (1) is a laminate sheet, it remains flat without curling and warpage. The base layer provides a desirable background color by disposing a color-printed layer.

What is claimed is:

1. An object containing pressed flowers sealed therein which is composed of a base layer, an intermediate layer of molten resin in which is sealed a dried pressed flower, and a surface layer of transparent film, with these three layers integrally laminated on top of the other, characterized in that the intermediate layer is formed by pressing with heating under reduced pressure from a meltable porous plastic film such that the molten plastic adheres closely to the pressed flower to seal it and also fixes the pressed flower to both the base layer and the surface layer of transparent film.

2. An object containing pressed flowers sealed therein as defined in claim 1, in which the meltable porous plastic film is one which has the three-dimensional open-cell structure.

3. An object containing pressed flowers sealed therein as defined in claim 1 or 2, in which the meltable porous plastic film is one which has an average pore diameter 1.0 mm or less.

4. An object containing pressed flowers sealed therein as defined in claim 1 or 2, in which the meltable porous plastic film is one which melts at temperatures 110° C. lower.

5. An object containing pressed flowers sealed therein as defined in claim 1 or 2, in which the intermediate layer has a thickness of 4000 μm or less.

6. An object containing pressed flowers sealed therein as defined in claim 1 or 2, in which the intermediate layer seals the dried pressed flowers such that subtantially no air bubbles remain in the periphery of the pressed flowers.

7. An object containing pressed flowers sealed therein as defined in claim 1, in which the surface layer has a thickness pressed flowers. 300 μm or less.

8. An object containing pressed flowers sealed therein as defined in claim 1 or 7, in which the surface layer of transparent film is a multi-layer laminate film.

9. An object containing pressed flowers sealed therein as defined in claim 8, in which the surface layer of transparent film has a hard coat layer as the outermost surface layer.

10. An object containing pressed flowers sealed therein as defined in claim 1, in which the base layer is glass, ceramic, plastic, paper, woody material, or metal, or a composite or laminate thereof.

11. An object containing pressed flowers sealed therein as defined in claim 10, in which the base layer is a plastic laminate sheet having a color printed layer or an integrally colored layer.

12. An object containing pressed flowers sealed therein as defined in claim 1, in which the color printed layer or integrally colored layer functions as an outermost layer or an intermediate layer or both.

13. An object containing pressed flowers sealed therein as defined in claim 11 or 12, in which the color printed layer is formed together with a white film layer.

14. An object containing pressed flowers sealed therein as defined in claim 11 or 12, in which the laminate plastic sheet is one which does not warp.

15. An object containing pressed flowers sealed therein as defined in claim 11 or 12, in which the laminate plastic sheet has a thickness 3000 μm or less.

* * * * *

UNITED STATES PATENT AND TRADEMARK OFFICE
CERTIFICATE OF CORRECTION

PATENT NO.    : 6,322,862 B1  
DATED         : November 27, 2001  
INVENTOR(S)   : Sakai It is certified that error appears in the above-identified patent and that said Letters Patent is hereby corrected as shown below:

<u>Column 9,</u>
Line 24, please delete "pressed flowers."

Signed and Sealed this

Thirteenth Day of August, 2002

*Attest:*

*Attesting Officer*

JAMES E. ROGAN
*Director of the United States Patent and Trademark Office*